United States Patent [19]

Weiland et al.

[11] Patent Number: 4,702,881
[45] Date of Patent: Oct. 27, 1987

[54] NUCLEAR REACTOR SPACER GRID

[75] Inventors: Lynne E. Weiland, Richland; Beryl H. Parks, Lexington, both of S.C.

[73] Assignee: Westinghouse Electric Corp., Pittsburgh, Pa.

[21] Appl. No.: 719,107

[22] Filed: Apr. 2, 1985

[51] Int. Cl.[4] .............................................. G21C 3/34
[52] U.S. Cl. .................................................... 376/442
[58] Field of Search ................ 376/442, 462, 441, 438

[56] References Cited

U.S. PATENT DOCUMENTS

| | | |
|---|---|---|
| Re. 30,247 | 4/1980 | Andrews et al. . |
| 2,832,733 | 4/1958 | Szilard . |
| 3,049,485 | 4/1962 | Tatlock et al. . |
| 3,379,619 | 4/1968 | Andrews et al. . |
| 3,389,056 | 6/1968 | Frisch . |
| 3,442,763 | 5/1969 | Chetter et al. ........................ 376/441 |
| 3,713,971 | 1/1973 | VanSanten et al. . |
| 3,920,515 | 11/1975 | Ferrari et al. ........................ 376/442 |
| 3,944,467 | 3/1976 | Biermann et al. ..................... 376/442 |
| 3,968,007 | 7/1976 | Huston . |
| 4,061,536 | 12/1977 | Creagan et al. . |
| 4,087,324 | 5/1978 | Johnson et al. . |
| 4,165,256 | 8/1979 | Jabsen ................................. 376/442 |
| 4,224,107 | 9/1980 | Delafosse et al. . |
| 4,306,937 | 12/1981 | Hensolt et al. ....................... 376/442 |
| 4,312,705 | 1/1982 | Steinke ................................ 376/442 |
| 4,585,616 | 4/1986 | DeMario et al. ..................... 376/442 |

FOREIGN PATENT DOCUMENTS

| | | | |
|---|---|---|---|
| 2001327 | 9/1970 | Fed. Rep. of Germany ...... 376/442 |
| 1531996 | 5/1968 | France . | |

Primary Examiner—Deborah L. Kyle
Assistant Examiner—Daniel Wasil

[57] ABSTRACT

A spacer grid for a nuclear fuel assembly having grid springs and opposing dimples which contact a fuel rod passing through a cell of the spacer grid along arcuate surfaces to cradle the fuel rod and cushion any vibration impact between the fuel rods and the grid springs and dimples during reactor operation and during fuel assembly shipping. The increased bearing surface between the fuel rods and grids also serves to reduce fuel rod scratching during fuel rod insertion. The grid springs and dimples may also be provided with ramped edges to further reduce fuel rod scratching. Stiffening ribs may be on the grid springs and/or dimples. The cradling action of the grid springs and dimples reduces deviations in fuel rod position from a centered position in a spacer grid cell.

27 Claims, 11 Drawing Figures

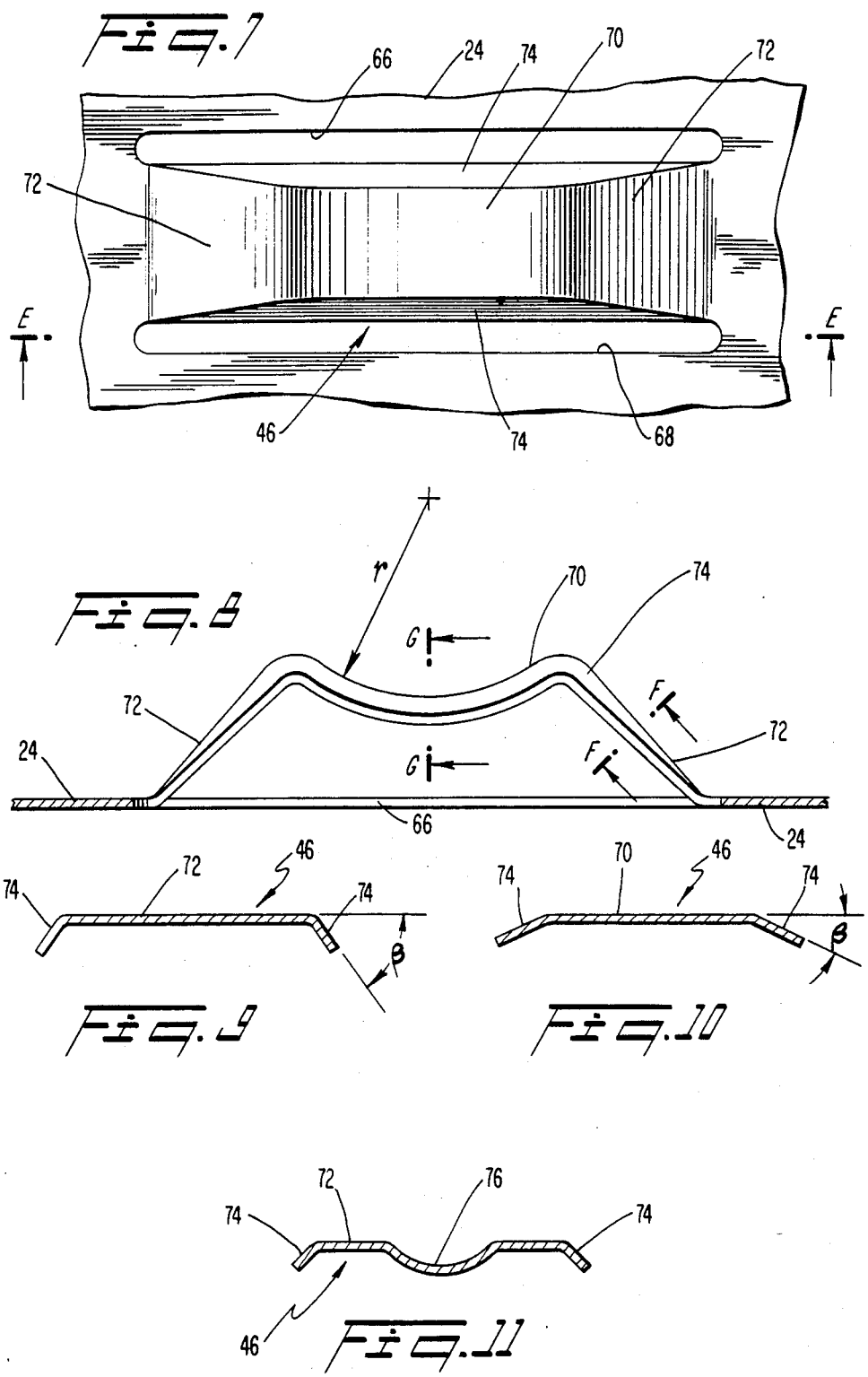

NUCLEAR REACTOR SPACER GRID

BACKGROUND OF THE INVENTION

1. Field of the Invention

The present invention relates generally to nuclear reactor fuel assemblies and more particularly to an improved spacer grid assembly for spacing and cradling fuel rods in a nuclear fuel assembly.

2. Background

In a nuclear fuel assembly, spacer grid assemblies are used to precisely maintain the spacing between the fuel rods in a nuclear reactor core, to prevent rod vibration, and to provide lateral support for the fuel rods. Conventional spacer grid assembly designs include a multiplicity of metal grid straps, interlocked into an egg-crate configuration designed to form cells through which fuel rods (standard cells) and control rod guide thimbles (thimble cells) pass. Slots are often utilized to effect the interlocking engagement between grid straps. Each standard cell provides support for one fuel rod at a given axial location through the use of relatively resilient grid springs and relatively rigid protuberancies (dimples) formed in or attached to the metal grid straps. A peripheral strap may be used to enclose the interlocked grid straps in order to impart strength and rigidity to the fuel assembly and to provide grid spring and dimple locations for the peripheral cells. In order to minimize the lateral displacement of fuel rods during operation and to improve the fuel characteristics of a fuel assembly, a number of such spacer grid assemblies may be spaced along the fuel assembly length. These grids are generally held in place by attachment to the control rod guide thimbles by well known bulging techniques or the like.

Examples of such spacer grid assemblies may be found in U.S. Pat. Nos. 3,389,056 to E. Frisch, 3,713,971 to Van Santen et al., 3,944,467 to Biermann et al., or 4,224,107 to Delafosse et al.

During operation in a nuclear reactor, the grid springs and dimples undergo intense radiation which cause the grid springs to tend to lose the initial spring force exerted against the fuel rods, thus permitting the fuel rods to vibrate and chatter against the dimples. The result may be fretting of the fuel rod cladding. In a typical fuel rod, the cladding comprises a metal tube that confines nuclear fuel pellets in the fuel rod. As used herein, the term "fretting" means a rubbing action between the fuel rod cladding and the grid springs and dimples. If severe enough, fretting is believed to result in fuel rod failure. In a nuclear fuel assembly, fretting may be caused by vibration of the rods induced by coolant and/or moderator fluid flow in the reactor core and possibly by vibration forces during shipping and insertion forces during fuel rod loading. Further, as will be understood by the artisan, fuel rods are generally long (several yards), slender cylinders. The round surface of these slender cylinders, when inserted into conventional spacer grid assemblies during fuel loading, typically rests on a flat or raised surface of conventional dimples and grid springs resulting in a point or line contact between the fuel rod surface and those springs and dimples. When loading fuel rods into such spacer grid assemblies, scratches known as loading scratches are a common problem. It is believed that when the fuel rods are inserted into such conventional spacer grid assemblies, the sharp edge on the dimples and springs tends to carve longitudinal scratches into the cladding.

Some conventional spacer grids contribute to an additional problem in that the fuel rod springs and dimples may not accurately position the fuel rod at the center of a standard cell. Deviations from that center position can result in adverse nuclear characteristics in the fuel assembly as well as hydraulic flow maldistribution and mechanical damage such as bent dimples and grid springs.

SUMMARY OF THE INVENTION

It is therefore an object of the invention to provide an improved spacer grid assembly which distributes forces between the fuel rod and the grid springs and dimples over a larger surface area as compared to conventional spacer grid designs.

It is a further object of the invention to provide a spacer grid assembly design which will reduce any tendency for the fuel rods to become scratched during loading and/or transport.

It is yet a further object of the invention to provide a spacer grid assembly design which will more accurately position a fuel rod within the standard cells of the spacer grid assembly.

It is further object of the present invention to provide an improved spacer grid assembly design which will reduce any tendency for fretting between fuel rod cladding and spacer grid springs and dimples.

To achieve these as well as other objects, and in accordance with the present invention, a nuclear fuel assembly containing a plurality of generally cylindrical fuel rods is provided which comprises a top and bottom nozzle and at least one control rod guide thimble extending between the top and bottom nozzle. A plurality of spacer grid assemblies are axially disposed along the control rod guide thimble for maintaining the fuel rods in a spaced lateral array. Each of the spacer grid assemblies comprises a plurality of grid straps interlocked into an egg-crate configuration to form standard cells through which the fuel rods pass. Each of the standard cells has at least one, and preferrbly two, grid springs and each grid spring has one, and preferably two, opposing dimples. Each of the grid springs and dimples has a surface portion contoured to cradle the generally cylindrical fuel rod as it passes through a standard cell.

In accordance with another aspect of the present invention, a spacer grid assembly for supporting generally cylindrical fuel rods in a nuclear fuel assembly is provided which comprises a plurality of grid straps interlocked into an egg-crate configuration to form cells through which fuel rods are adapted to pass. At least one, and preferably two, grid springs and at least one, and preferably two, dimples opposing each grid spring are disposed in each of the cells in order to support the fuel rods as they pass through the cells. The grids springs and opposing dimples have arcuate face portions adapted to cradle the generally cylindrical fuel rod as the fuel rod passes through the cell.

Additional objects, advantages and novel features of the invention will be set forth, in part in the description which follows, and in part will become apparent to those skilled in the art by practice of the invention. The objects and advantages of the invention may be realized and attained by means of the invention as particularly pointed out in the appended claims.

BRIEF DESCRIPTION OF THE DRAWINGS

The accompanying drawings, which are incorporated in and form a part of the present specification, illustrate various embodiments of the present invention and, together with the descriptions, serve to explain the principles of the invention. In the drawings, like reference numerals designate like or corresponding parts throughout the several views. In the drawings:

FIG. 3 is an elevational view of a spacer grid spring according to the principles of the present invention;

FIG. 4 is a section through section lines A—A of FIG. 3;

FIG. 7 is an elevational view of a spacer grid dimple according to the principles of the present invention;

FIG. 8 is a section through section lines E—E of FIG. 7;

FIG. 9 is a section through section lines F—F of FIG. 7;

FIG. 10 is a section through section lines G—G of FIG. 7;

FIG. 11 is an alternate embodiment of the dimple configuration of FIG. 9 having a stiffening rib.

DETAILED DESCRIPTION OF THE INVENTION

Reference will now be made in detail to a presently preferred embodiment of the invention, an example of which is illustrated in the accompanying drawings. In the following description, it is to be understood that terms such as "forward", "rearward", "left", "right", "downwardly", and the like, are words of convenience and are not to be construed as limiting terms.

Figure 1:
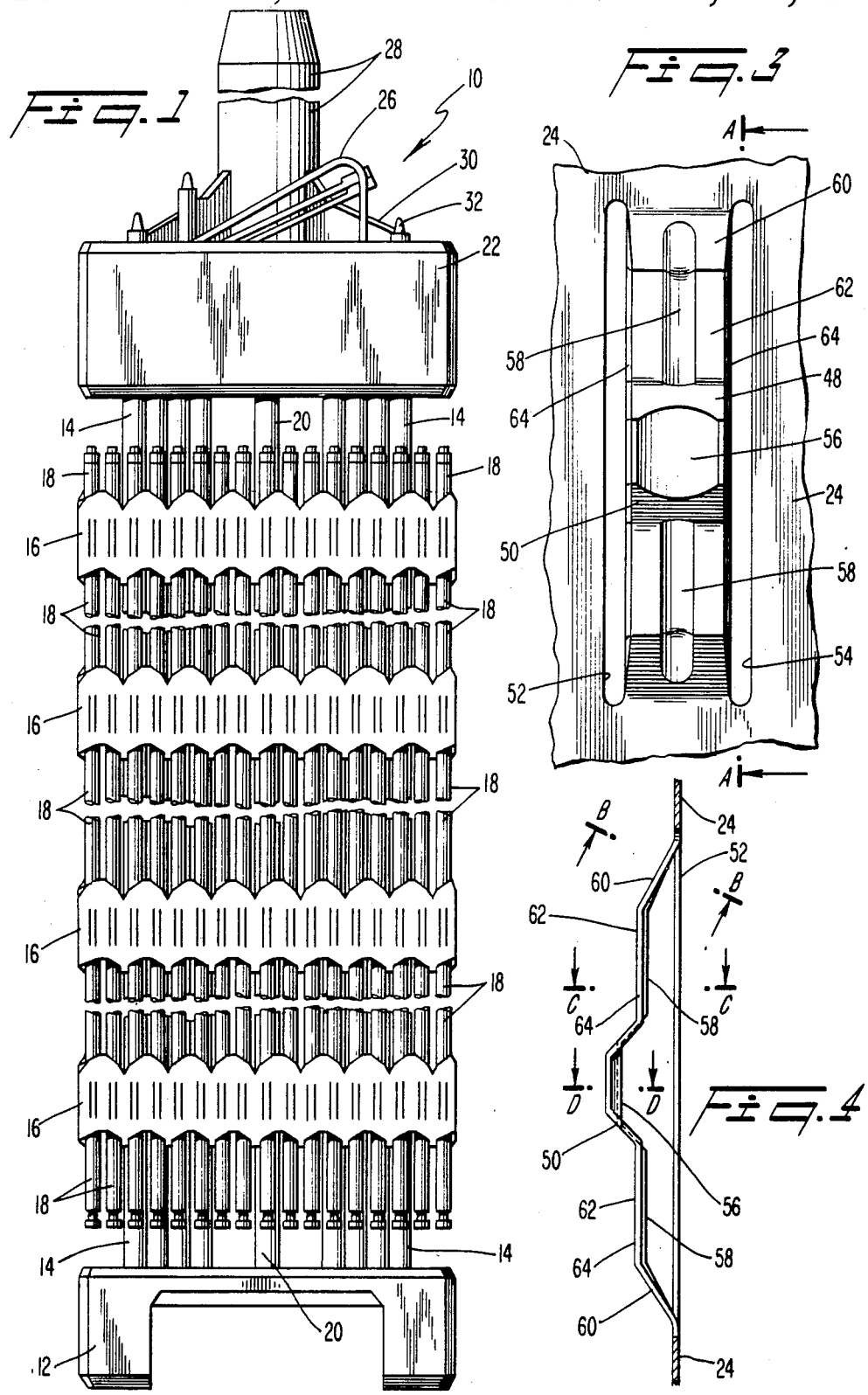
FIG. 1 is an elevational view of a conventional fuel assembly incorporating the improved spacer grid structure in accordance with the principles of the present invention.

Referring now to the drawings and particularly to FIG. 1, there is shown a conventional fuel assembly constructed in accordance with well known practices and generally indicated by the reference numeral 10. The fuel assembly 10 basically comprises a lower end structure or bottom nozzle 12 for supporting the assembly on the lower core plate (not shown) in the core region of a reactor (not shown). A number of axially extending control guide tubes or thimbles 14 project upwardly from the bottom of nozzle 12. A plurality (only 4 of which are shown) of spacer grids 16 for transversely spacing supporting an organized array of elongated fuel rods 18 are axially spaced along the guide thimbles 14. Preferably, an instrumentation tube 20 is located in the center of the assembly and an upper end structure or top nozzle 22 is attached to the upper ends of the guide thimbles 14 in a conventional manner to form an integral assembly capable of being conventionally handled without damaging the assembly components. The bottom nozzle 12 and the top nozzle 22 are conventional, including end plates (not shown) with flow openings (not shown) for the upward longitudinal flow of a liquid coolant, such as water, to pass up and along the various fuel rods 18 to receive the thermal energy therefrom.

The top nozzle 22 includes a transversely extending end plate or adapter plate (not shown) having upstanding sidewalls secured to the peripheral edges thereof and defining an enclosure or housing. An annular flange (not shown) is secured to the top of the sidewalls and suitably clamped to this flange are leaf springs 26, only one of which is shown in FIG. 1, which cooperates with the upper core plate (not shown) in a conventional manner to prevent hydraulic lifting of the fuel assembly 10 caused by upward coolant flow while allowing for changes in the fuel assembly length due to core induced thermal expansion and the like. Disposed within the opening defined by the sidewalls of the top nozzle 22 is a conventional rod cluster control assembly 28 having radially extending flukes 30 connected to the upper end of control rod 32 for vertically moving the control rods in the control rod guide thimbles 14 in a well known manner.

To form the fuel assembly 10, spacer grids 16 are attached to the longitudinally extending guide thimbles 14 at predetermined axially spaced locations. The fuel rods 18 are inserted into and through standard cells formed by the interlocking grid straps. The lower nozzle 12 is suitably attached to the lower ends of the guide thimbles 14 and the top nozzle 22 is attached to the upper ends of the guide thimbles 14. For a further description of the fuel assembly 10, reference should be made to U.S. Pat. No. 4,061,536, the contents of which are hereby incorporated by reference.

The fuel assembly 10 depicted in the drawings is of the type having a square array of fuel rods 18 with the control rod guide thimbles 14 being strategically arranged within the fuel rod array. Further, the bottom nozzle 12, the top nozzle 22, and likewise the spacer grid 16 are generally square in cross-section. In that the specific fuel assembly presented in the drawings is for illustrational purposes only, it is to be understood that neither the shape of the nozzles or the grids nor the number and configuration of the fuel rods and guide thimbles are to be limiting, and the invention is equally applicable to shapes, configurations, and arrangements other than the ones specifically illustrated.

Before describing the spacer grid structure 16 of the present invention in detail, it is noted that the fuel rods 18 are laterally positioned in a predetermined array by the support of spacer grids 16. Spacer grids per se are well known in the art and are used to precisely maintain spacing between fuel rods, to prevent rod vibration, to provide lateral support and, to some extent, to frictionally retain the rods against longitudinal movement. Conventional spacer grids, such as the ones shown and described in U.S. Pat. Nos. 3,379,619 and 4,061,536, hereby incorporated by reference, comprise a plurality of straps interfitted into an egg-crate configuration which form cells for accepting the fuel rods. Each cell supports one fuel rod at a given axial location through the use of spring fingers and dimples which frictionally engage the fuel rods, normally in a six-point support arrangement. The fuel rods 18 are of a generally cylindrical configuration and are supported in an upstanding spaced array by the spacer grids. The spacer grids may be provided with coolant flow mixing vanes which is a design consideration of the specific fuel assembly involved.

Figure 2:
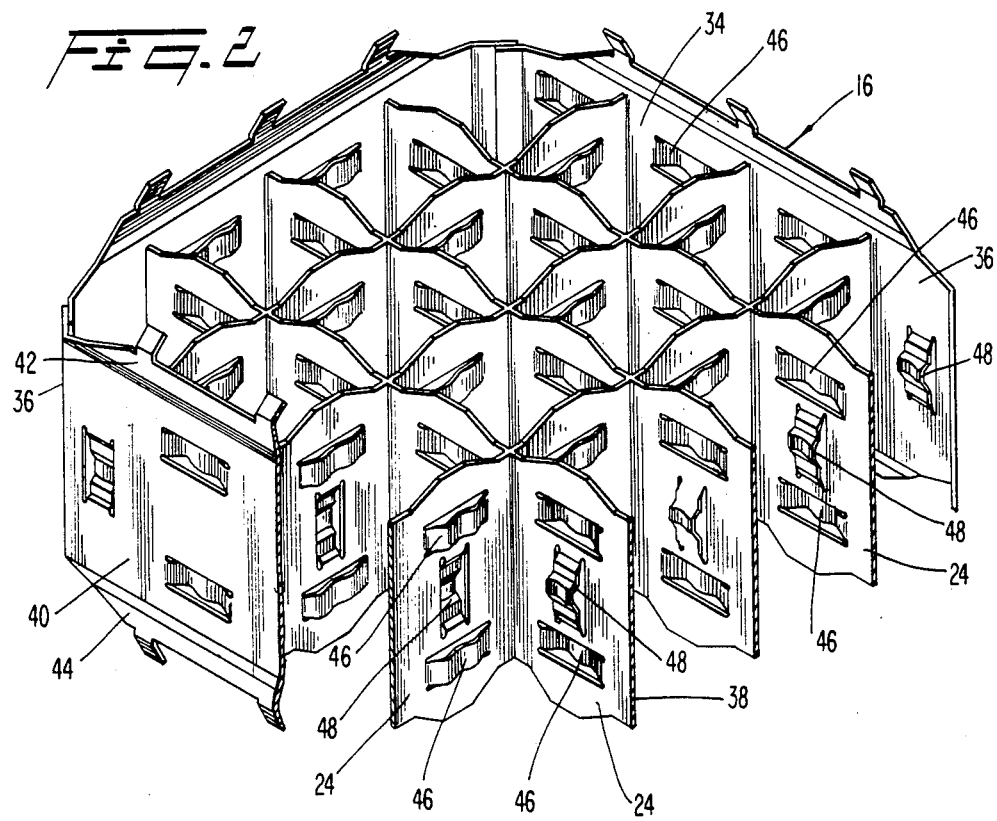
FIG. 2 is an isometric view, partially broken away, of a spacer grid according to the princples of the present invention.

Turning now to FIG. 2 there is depicted a partially broken away, perspective view of a spacer grid 16 which includes a plurality of interfitted grid straps 24 which are arranged in an egg-crate fashion to create standard cells 34 for separately enclosing the fuel rods 18. The spacer grid 16 may also have outer straps 36 interconnected to form a generally square-shaped array which surrounds the grids straps 24 about their heightwise edges 38. For fuel assemblies which will be used in a boiling water reactor and therefore enclosed in a "can", it is advantageous for each outer strap 36 to have a central portion 40 and top and bottom resilient border portions 42 and 44, respectively. Preferably, the border portions 42 and 44 are integral with the central portion 40. In any event, the grid straps heightwise edges are generally fastened to the surrounding outer straps 36. The border portions 42 and 44 may vertically extend beyond the central portions 40 of the outer strap 36. Preferably, the border portions 42 and 44 may also project horizontally outward beyond the central portion 40 of the outer strap 36 in order to cushion the enclosed fuel rods from the effects of forces acting on a shipping container or the like used to transport fuel assemblies to reactors. The border portions 42 and 44 may alternatively be fashioned to include mixing vane structures to create turbulence and mixing of the coolant flow through the fuel assembly. While mention has been made above of the use of the spacer grids in a boiling water reactor fuel assembly, it is emphasized that the spacer grid 16 can be utilized in any fuel assembly, including a pressurized water reactor fuel assembly such as that illustrated in FIG. 1.

It is recommended that the outer straps 36 be made of a low neutron capture cross-section material such as zirconium or a zirconium alloy, and that they be attached together and to the grid straps heightwise edges 38 by welding.

In the spacer grid 16, each standard cell 34 has a longitudinal axis and each of its associated grid straps 24 has at least one, and preferably two, longitudinally spaced, relatively rigid dimples 46 projecting into the cell 24 on a wall opposing a grid spring 48 for supporting an associated fuel rod 18 therein. Further, it is preferred that each cell have two grids springs, deposed on adjacent walls. Thus, in the preferred embodiment, each fuel rod is supported in each cell at six points.

The dimples 46 on a pair of adjacent associated grid straps are preferably generally open to longitudinal coolant flow therethrough, i.e. they face the coolant flow edgewise, while the grid springs 48 on the other adjacent cell walls are generally closed to fluid flow, i.e. their edges are arranged longitudinally with respect to the direction of coolant flow. As will be understood by the artisan, the orientation of the dimples and grid springs can, of course, be reversed. Alternatively, both the springs and dimples can be formed open with respect to coolant flow or both can be formed closed with respect to coolant flow. It is desirable that the dimples 46 and grid springs 48 project generally perpendicularly towards the longitudinal axis of the cell 34. It is also preferred that where a pair of dimples 46 are formed in the same wall of a cell, those dimples be axially spaced and aligned.

Preferably, the dimples 46 are generally longitudinally running arches and are generally trapezoidal in shape, while the grid springs 48 are generally transversely running arches having a raised portion 50 for cradling a fuel rod 18 and are likewise generally trapezoidal in shape. It is preferred that the dimples 46 and grid springs 48 be integral with the grid straps 24 and that the grid straps be made from a low neutron capture cross section material such as zirconium or a zirconium alloy.

As used above, words such as "longitudinal" and "transverse" are intended to indicate directions relative to the axis of the spacer grid cells.

Figure 5:
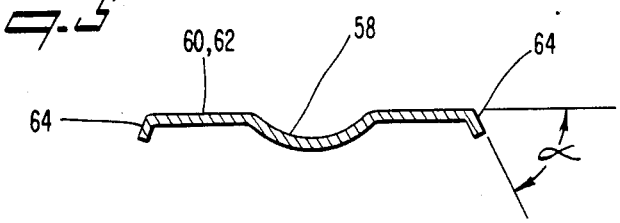
FIG. 5 is a section through section lines B—B or C—C of FIG. 3, which sections are similar to each other.
Figure 6:
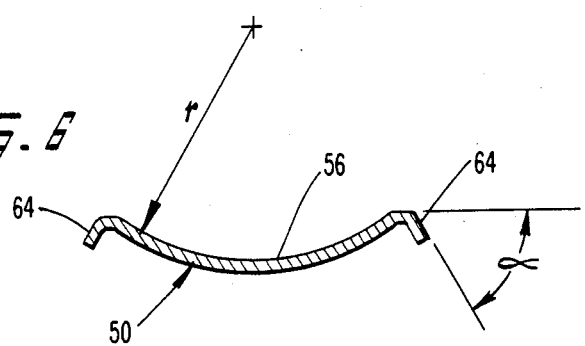
FIG. 6 is a section through section lines D—D of FIG. 3.

Turning now to FIGS. 3 through 6, the fuel rod cradling grid springs 48 will be described in detail. As alluded to above, the springs 48 may be integrally formed in the grid strap 24 from a strip formed between slots 52 and 54 which may be punched or otherwise formed in the grid strap 24. According to the invention, the raised portion 50 of the grid spring is modified to provide a greater bearing surface between the grid spring and fuel rod, thereby distributing any impact forces, arising from flow-induced vibration, transportation, or the like, over a larger surface area. In addition, the larger contact surface between the fuel rods and the grid springs lessens or eliminates scratching of the fuel rod cladding during loading or unloading operations. In order to provide a larger bearing surface, the raised portion 50 of the grid springs 48 is provided with an arcuate surface 56 which is curved to approximately follow the surface contour of the generally cylindrical fuel rods. To further lessen any fretting tendency, the springs 48 may be provided with ridges 58 formed in the transverse center of the arch and running along the arch from a base portion 60 through a portion 62 of the base which extends generally parallel to the grid strap 24 on either side of the center portion 50. The ridge 58 adds stiffness to the grid spring 48. Additional stiffness may be provided by rolling down the edges of the springs to form a stiffening flange 64 in the form of a ramped edge. As best seen in FIG. 5, the stiffening flange 64 may be formed at an angle $\alpha$ with respect to the major face of the grid spring. Preferably, the stiffening flange 64 extends longitudinally the entire length of the grid spring. The angle $\alpha$ may vary between 0 and 90 degrees and is preferably in the range of 30 to 60 degrees.

Where a ridge 58 is utilized, it is preferably formed concave downwardly with respect to the arcuate surface 56. The stiffening flange 64 and the ridge 58 are independent and either or both may be used with the cradle grid spring design to improved the stiffness of the grid spring and to help center the fuel rods as they are loaded into the fuel assembly.

Referring now to FIGS. 7 through 10, the fuel rod cradling dimples 46 will be described in detail. Like the springs 48, the dimples 46 are preferably formed from a strip of grid strap material, the strip being defined by the space between the slots 66 and 68. As best seen in FIG. 8, the dimples 46, like the grid springs discussed above, are generally formed in the shape of an arch. The dimples 46 have a center portion 70 and base portion 72 extending from the grid strap 24. Since, in the illustrated embodiment, the dimples 46 are open in the direction of flow of coolant through the fuel assembly, the center portion 70 is curved in an arc extending between the base portions 72 in order to cradle the generally cylindrical fuel rod as it passes through the grid cells. Preferably, the radius of curvature, r, of the arc formed in either the grid springs or dimples is slightly greater than the radius of curvature of the outside diameter of the fuel rod to be supported in order to cradle the fuel rod generally along at least a line of contact while tolerating small deviations in the location of grid springs and dimples in the spacer grid assembly. While the cradling action of the inventive grid springs and dimples will also be realized if the radius of curvature, r, is similar to that of the fuel rod, care should be taken to ensure that at a minimum, the radius r is at least equal to the radius of curvature of the fuel rod to be supported when the fuel rod is in its expanded, i.e. heated condition.

Since the fuel rods are inserted parallel to the face of the dimples 46, it is desirable to roll down the edge of the dimple facing the direction of insertion of the fuel rods to form a ramp which will avoid carving scratches on the fuel rod cladding. As best seen in FIGS. 9 and 10, the rolled down or ramp portion may comprise a flange 74 disposed at an angle $\beta$, with respect to the arch to form a generally smooth ramp with respect to the base portions 72 and center portion 70. The angle $\beta$ between the face of the dimple and the flange 74 may vary from 0 to 90 degrees with a preferred range of between about 30 to 60 degrees. Within this range, the flange will function to provide additional stiffness to the dimple as well as to assist the loading of fuel rods without scratching.

As shown in FIG. 11, the base portion 72 of the dimples may also be provided with a stiffening rib 76 if additional stiffness is required.

During fabrication of a fuel assembly or operation in a reactor, a fuel rod could begin to deviate from its nominal center position aligned with the axis of the grid cell. The fuel rod cradle spacer grid design according to the present invention requires a fuel rod to "ride up" to a higher position on the dimple or spring in order to deviate from this nominal position. This riding up movement tends to force a deviating fuel rod back into the "valley" of the cradle, thereby reducing any tendency toward large deviations from the nominal center position which could otherwise bend dimples and springs and alter the nuclear, thermal, and hydraulic characteristics of the fuel assembly.

During operation, the cradle grid spring and dimple design of the present invention also tend to maintain the fuel rods centered in the grid cells. This is particularly important after radiation begins to relax the force exerted on the fuel rods by the grid springs. In this regard, the cradle design tends to maintain a more uniform coolant flow distribution about the fuel rods. If, during operation, a fuel rod experiences "lift off" from a grid spring or dimple, generally no more than a few thousandths of an inch, the flow of coolant into and out of the cavity between the fuel rod and the spring or dimple surface will be hydraulic damped more by the cradle design than by the prior art flat design due to the more restrictive flow configuration. This is because with conventional flat dimples, the fuel rod only touches the dimple along a tangent line or point after which they curve away from each other providing a large cavity in which coolant flow can induce additional lift off. Reduction of this lift off cavity will in turn reduce somewhat the frequency of vibration of the fuel rod and thereby tend to reduce the severity of any impact of the fuel rod cladding on the spring or dimple, thus improving stability and reducing any tendency toward fretting.

The foregoing description of a preferred embodiment of the invention has been presented for purposes of illustration and description. It is not intended to be exhaustive or to limit the invention to the precise forms disclosed, and obviously many modifications and variations are possible in light of the above teachings. The embodiments chosen and described were selected in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim as my invention:

1. A nuclear fuel assembly containing a plurality of generally cylindrical fuel rods having an outside radius and comprising:
   a top nozzle;
   a bottom nozzle;
   a control rod guide thimble extending between said top and bottom nozzles;
   a plurality of fuel rod spacer grid assemblies axially disposed along said control rod guide thimble for maintaining the fuel rods in a space lateral array, each of said spacer grid assemblies comprising a plurality of grid straps interlocked into an eggcrate configuration to form cells through which said fuel rods pass, each of said cells having a grid spring and an opposing dimple, each of said grid spring and dimple having an arcuate surface portion contoured o generally conform, in both the axial and radial directions, to the surface of said generally cylindrical fuel rods and adapted to contact said fuel rods along at least a line of contact as the fuel rods pass through said cells, said arcuate portions having radius of curvature equal to or greater than the outside radius of said fuel rods.

2. The nuclear fuel assembly of claim 1 wherein said grid spring is generally arch shaped and is integrally formed in one of said grid straps.

3. The nuclear fuel assembly of claim 2 wherein said grid spring surface portion is generally centered on said grid spring and said grid spring further comprises base portions adjacent either side of said centrally disposed surface portion, said base portions being provided with a stiffening rib.

4. The nuclear fuel assembly of claim 2 wherein said grid spring generally lies in a plane and has an edge extending along its length and wherein said edge is rolled down to form a flange extending at an angle $\alpha$ from said plane towards said grid strap.

5. The nuclear fuel assembly of claim 4 wherein angle $\alpha$ is in the range of between greater than 0 to 90 degrees.

6. The nuclear fuel assembly of claim 4 wherein said angle $\alpha$ is in the range of between 30 and 60 degrees.

7. The nuclear fuel assembly of claim 1 wherein said dimple is oriented on said grid strap to be generally open to a longitudinal coolant flow through said fuel assembly.

8. The nuclear fuel assembly of claim 1 said dimple is generally arch shaped and is integrally formed from one of said grid strap wherein the arch which forms said dimple is disposed edgewise with respect to a longitudinal coolant flow through said fuel assembly.

9. The nuclear fuel assembly of claim 1 wherein said grid spring is oriented on said grid strap to be generally closed to a longitudinal coolant flow through said fuel assembly.

10. The nuclear fuel assembly of claim 1 said grid spring is generally arch shaped and integrally formed from one of said grid straps and wherein the arch which forms said grid spring is disposed generally parallel with respect to a longitudinal coolant flow direction through said fuel assembly.

11. The nuclear fuel assembly of claim 8 wherein said dimple surface portion is generally centered on said dimple and said dimple further comprises base portions adjacent either side of said centrally disposed surface portion.

12. The nuclear fuel assembly of claim 8 wherein said dimple has a major surface and an edge extending along its length and wherein said edge is rolled down from said major surface to form a flange extending at an angle β from said major surface towards said grid strap.

13. The nuclear fuel assembly of claim 12 wherein angle β is in the range of between greater than 0 to 90 degrees.

14. The nuclear fuel assembly of claim 12 wherein said angle β is in the range of between 30 and 60 degrees.

15. A spacer grid assembly for supporting a generally cylindrical fuel rod having an outside radius in a nuclear fuel assembly comprising;
    a plurality of grid straps interlocked into an egg-crate configuration to form a cell through which said fuel rod is adapted to pass;
    a grid spring and an opposing dimple disposed in said cell for supporting said fuel rod;
    said grid spring and opposing dimple having arcuate face portions having a radius of curvature equal to or greater than the outside radius of the fuel rod and contoured to generally conform, in both the axial and radial directions, to the surface of said generally cylindrical fuel rod and adapted to contact said fuel rod along at least a line of contact as it passes through said cell.

16. The spacer grid assembly of claim 15 wherein said grid spring comprises a generally arch-shaped spring projecting from one of said interlocked grid straps, said grid spring having a raised center portion, projecting toward a center of said cell, into which said arcuate face portion is formed.

17. The spacer grid assembly of claim 16 wherein said grid spring further comprises base portions on either side of said raised center portion, said base portions having a stiffening rib formed therein.

18. The spacer grid assembly of claim 16 wherein said cell has a longitudinal axis and said arch-shaped spring extends generally parallel to said longitudinal axis and has longitudinally extending edges, and wherein said edges are formed into stiffening flanges extending generally towards said one grid strap at an angle α with regard to a major surface of said grid spring.

19. The spacer grid assembly of claim 18 wherein said angle α is in the range of between greater than 0 to 90 degrees.

20. The spacer grid assembly of claim 18 wherein said angle α is in the range of between 30 to 60 degrees.

21. The spacer grid assembly of claim 15 wherein said dimple comprises a generally arch-shaped member projecting from one of said interlocked grid straps, said arch-shaped member having a center portion into which said arcuate surface portion is formed.

22. The spacer grid assembly of claim 21 wherein said arch-shaped member further comprises base portions on either side of center portion, said base portions having a stiffening rib formed therein.

23. The spacer grid assembly of claim 21 wherein said cell has a longitudinal axis and said arch-shaped member extends generally transverse with respect to said longitudinal axis, said arch-shaped member having longitudinally extending edges, said edges being formed into flanges extending generally toward said one grid strap at an angle β with respect to a major surface of said arch-shaped member to stiffen said dimple and to form a ramp surface to reduce fuel rod scratching during fuel rod loading in said spacer grid assembly.

24. The spacer grid assembly of claim 15 wherein said assembly comprises a plurality of cells, at least some of said cells having grid springs on two adjacent walls and a pair of axially spaced and aligned dimples opposing each of said grid springs whereby a fuel rod passing through the cell is cradled at six locations in said cell to center the fuel rod in the cell.

25. The spacer grid assembly of claim 21 wherein said cell has a longitudinal axis and said arch-shaped member has a major face and edges extending generally transverse to said longitudinal axis and wherein said edges are formed into flanges extending generally towards said one grid strap at an angle β with regard to said major surface.

26. The spacer grid assembly of claim 25 wherein said angle β is in the range of between greater than 0 to 90 degrees.

27. The spacer grid assembly of claim 25 wherein said angle β is in the range of between 30 to 60 degrees.

* * * * *